United States Patent
Melville

(10) Patent No.: US 10,315,703 B2
(45) Date of Patent: Jun. 11, 2019

(54) VEHICLE UPPER STRUCTURE

(71) Applicant: McLaren Automotive Limited, Surrey (GB)

(72) Inventor: Robert Melville, Surrey (GB)

(73) Assignee: McLaren Automotive Limited, Surrey (GB)

( * ) Notice: Subject to any disclaimer, the term of this patent is extended or adjusted under 35 U.S.C. 154(b) by 65 days.

(21) Appl. No.: 15/674,499

(22) Filed: Aug. 10, 2017

(65) Prior Publication Data
US 2018/0050728 A1  Feb. 22, 2018

(30) Foreign Application Priority Data

Aug. 22, 2016  (GB) .................................. 1614344.8

(51) Int. Cl.
| | |
|---|---|
| *B62D 25/04* | (2006.01) |
| *B62D 25/08* | (2006.01) |
| *B60J 1/10* | (2006.01) |
| *B60J 1/18* | (2006.01) |
| *B60J 7/20* | (2006.01) |

(52) U.S. Cl.
CPC ................ *B62D 25/08* (2013.01); *B60J 1/10* (2013.01); *B60J 1/18* (2013.01); *B62D 25/04* (2013.01); *B60J 7/20* (2013.01)

(58) Field of Classification Search
CPC .. B62D 25/08; B62D 25/04; B60J 1/18; B60J 1/10; B60J 7/20
USPC ........................................ 296/203.04, 193.06
See application file for complete search history.

(56) References Cited

U.S. PATENT DOCUMENTS

| | | | | |
|---|---|---|---|---|
| 7,156,446 | B2 * | 1/2007 | Perakis | .................... B60J 1/183 |
| | | | | 280/756 |
| 7,494,178 | B2 * | 2/2009 | Nygaard | ................. B60R 21/13 |
| | | | | 180/274 |
| 8,388,046 | B2 | 3/2013 | Hutter et al. | |
| 9,186,969 | B2 | 11/2015 | Ugolini | |
| 9,636,982 | B2 * | 5/2017 | Senoo | ....................... B60J 7/202 |
| 2011/0254318 | A1 * | 10/2011 | Thomas | ................. B62D 25/04 |
| | | | | 296/193.06 |
| 2016/0089966 | A1 | 3/2016 | Matsumoto et al. | |

FOREIGN PATENT DOCUMENTS

CN            104290819 A         1/2015

OTHER PUBLICATIONS

Search report issued in Great Britain application GB1614344.8 dated Jan. 6, 2017 (3 pages).

* cited by examiner

*Primary Examiner* — Pinel E Romain

(74) *Attorney, Agent, or Firm* — Fish & Richardson P.C.

(57) ABSTRACT

A vehicle comprising a body having an occupant cabin and an upper structure at least partially enclosing the upper part of the occupant cabin, the upper structure comprising: a rear window located in the lateral center of the vehicle; first and second structural members extending along either side of the rear window; and first and second lateral windows located on either side of the rear window, each of the lateral windows having an inboard edge and an outboard edge, the inboard edge being located rearward of the outboard edge in at least one plane parallel to the running plane of the vehicle, and a respective one of the first and second members extending along the inboard edge, and the lateral windows being located at an outer rear corner of the upper structure edge.

17 Claims, 3 Drawing Sheets

VEHICLE UPPER STRUCTURE

CROSS-REFERENCE TO RELATED APPLICATIONS

This application claims priority to Great Britain Application Serial No. GB 1614344.8, filed on Aug. 22, 2016.

This invention relates to vehicle cabins and associated structures.

FIG. 1 is a view of a generalised design of a mid-engined sports car from above, behind and one side. The upper structure of the vehicle comprises a roof 1 which is suspended above the main body of the vehicle by front pillars 2 and rear pillars 3. On the sides of the vehicle between the front and rear pillars there is a door glass panel 4 and a side glass panel 5. At the rear of the vehicle, laterally centrally between the two rear pillars, is a rear glass panel 6. The front pillars may be known as A pillars and the rear pillars may be known as C pillars.

The upper structure should be sufficiently robust to protect the occupants from crush injuries in the event that the vehicle rolls over. As a result, the front and rear pillars are usually relatively thick. A problem with thick pillars is that they restrict the driver's visibility. This problem is particularly acute in vehicles that have only a single row of seats, as is the case is most high-performance cars, because then the driver's head is located relatively close to the rear pillar. That increases the angle of view obscured by the pillar.

One way to reduce the thickness of the A and C pillars is to introduce a B pillar, normally at the door shut line 7. A problem with this is that it can spoil the aesthetics of the car, and if the car is desired to have a convertible roof then the B pillar might be ineffective to provide roll-over protection when the roof is open. In any event, the B pillar is of limited effectiveness in stiffening the rear of the vehicle.

Another option is to make the C pillar thicker in the X dimension of the car and slimmer in the Y dimension. This can provide improved visibility directly to the rear of the car, but tends to give worse visibility to the rear quarters, which is important for parking manoeuvres.

Another option is to provide active roll-over protection. Roll-over bars can be concealed within the vehicle's wings until a dangerous situation is detected, when they can be automatically raised. This avoids the roll-over bars being visible during normal driving, but the safety of the vehicle is dependent on the activation system working properly.

There is a need for an improved system for providing support to a vehicle roof and/or for stiffening the rear of a vehicle.

According to the present invention there is provided a vehicle comprising a body having an occupant cabin and an upper structure at least partially enclosing the upper part of the occupant cabin, the upper structure comprising: a rear window located in the lateral centre of the vehicle; first and second structural members extending along either side of the rear window; and first and second lateral windows located on either side of the rear window, each of the lateral windows having an inboard edge and an outboard edge, the inboard edge being located rearward of the outboard edge in at least one plane parallel to the running plane of the vehicle, and a respective one of the first and second members extending along the inboard edge.

Each of the first and second members may have a lower end and an upper end, the upper end being located forward of the lower end.

The vehicle may comprise a third structural member extending between the upper ends of the first and second members.

The vehicle may have has a roof. The third structural member may be an elongate member. The third structural member may be located to bear on the roof to resist downward force on the roof.

The vehicle may have a retractable roof. The third structural member may be located to bear on the roof to resist downward force on the roof when the roof is in its deployed configuration.

The rear window may be transparent. It may be capable of being seen through from the cabin. To that end the upper structure inboard of the rear window may define a through hole inboard of the rear window and communicating with the cabin.

The lateral windows may be transparent. It may be capable of being seen through from the cabin. To that end the upper structure inboard of the rear window may define a through hole inboard of the rear window and communicating with the cabin.

For each lateral window, the inboard edge of that window may be located rearward of the outboard edge of that window in all planes parallel to the running plane of the vehicle through which the window can be seen from the cabin.

The vehicle may comprise third and fourth structural members extending along the outboard edges of respective ones of the first and second lateral windows.

The first and third structural members may collectively form a composite C pillar at one side of the vehicle upper structure. The third and fourth structural members may collectively form a composite C pillar at the other side of the vehicle upper structure.

The vehicle may comprise side windows running along the sides of the upper structure. The side windows may be rigidly attached to the upper structure, e.g. so that they cannot be articulated with respect to the upper structure.

The inboard edge of each lateral window may be aligned with the neighbouring edge of the rear window. The outboard edge of each lateral window may be aligned with the neighbouring edge of a respective one of the side windows.

The third and fourth structural members may extend along the rear edges of respective ones of the side windows.

The lateral windows may be torsionally offset between their upper and lower ends.

The vehicle may have a single row of seats.

The vehicle may be a road vehicle.

The running plane of the vehicle may be taken to be the X-Y plane of the vehicle.

The present invention will now be described by way of example with reference to the accompanying drawings. In the drawings.

Figure 2:
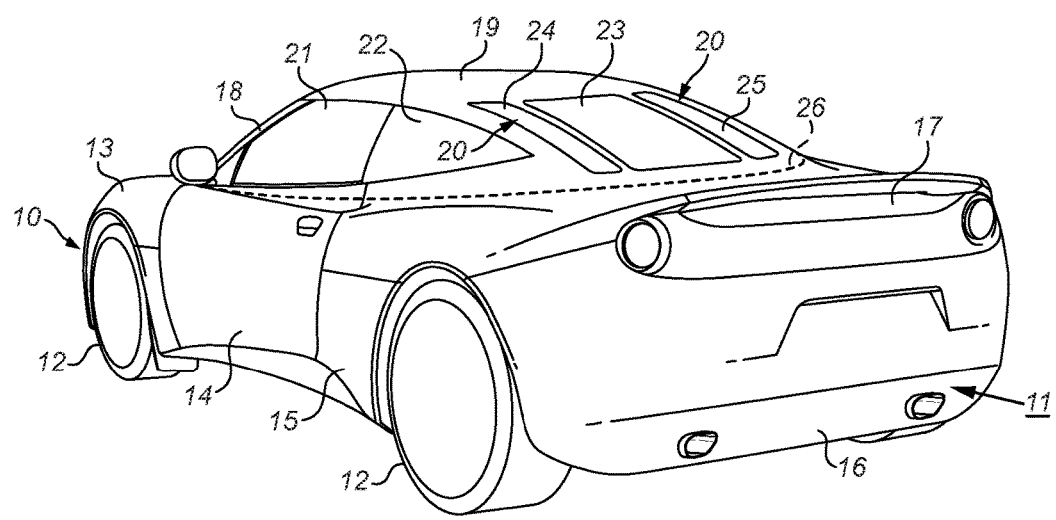
FIG. 2 is a rear three-quarters view of a vehicle.

FIG. 2 shows an automobile or car. The front of the car in its normal direction of travel is indicated at 10. The rear of the car in its normal direction of travel is indicated at 11. In this document the terms "rear"/"rearward" and "front"/

"forward" are used with respect to the normal direction of travel of the vehicle. Along its side the car has road wheels 12, a front wing 13, a side door panel 14, and a rear wing 15. At its rear the car has a rear bumper or fender 16 and a rear deck 17. The upper structure of the car comprises A pillars 18, a roof 19 and C pillars 20. Between the A pillars and the C pillars along the side of the car's upper structure are glass panels: a door glass panel 21 and a side glass panel 22. The door glass panel 21 is part of a side door which opens from the body of the car. The outer upper part of the door is provided by the door glass panel 21 and the outer lower part of the door is provided by the side door panel 14. The side glass panel is located rearward of the door glass panel and is fixed relative to the body of the car. The side glass panel is directed to the side of the car. Between the C pillars along the rear of the car's upper structure is a rear glass panel 23. The rear glass panel is fixed relative to the body of the car.

A passenger cabin is provided below the roof 19. Access to the passenger cabin is through the side doors. In this example the passenger cabin contains a single row of seats. In this example the seats in the row are a driver's seat and a passenger's seat, but additional seats could be provided in the row. The seats are arranged alongside each other. The seats in the row may be staggered in the vehicle's X direction, but conveniently their bases overlap in the X direction in at least one available configuration of the seats. The cabin could comprise more than one row of seats: for example, a front row and a rear row.

The roof of the car may be retractable so that the car can be driven in an open-top configuration. The vehicle may comprise a mechanism for driving the roof to move from its normal/deployed position over the cabin to a stowed position. In the stowed position it may, for example, reside under the rear deck 17.

The vehicle may be powered to drive by any suitable machine, for example an internal combustion engine and/or one or more electric motors. Conveniently the centre of mass of the vehicle's motive power machines is rear of the forward row of seats. Conveniently that centre of mass is between the road wheels in the X direction. The vehicle may be a mid-engined car.

Figure 3:
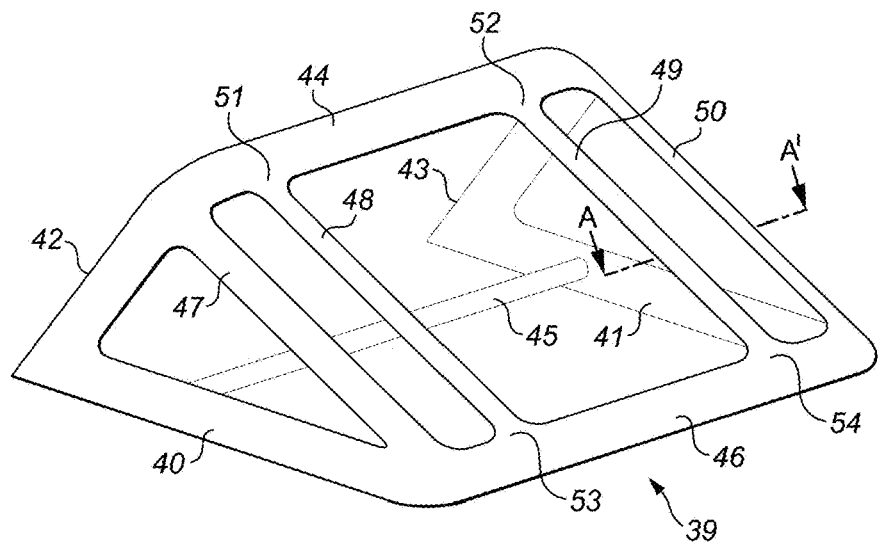
FIG. 3 is a rear-three quarters view of the upper structure of the vehicle of FIG. 2 from outside.
Figure 4:
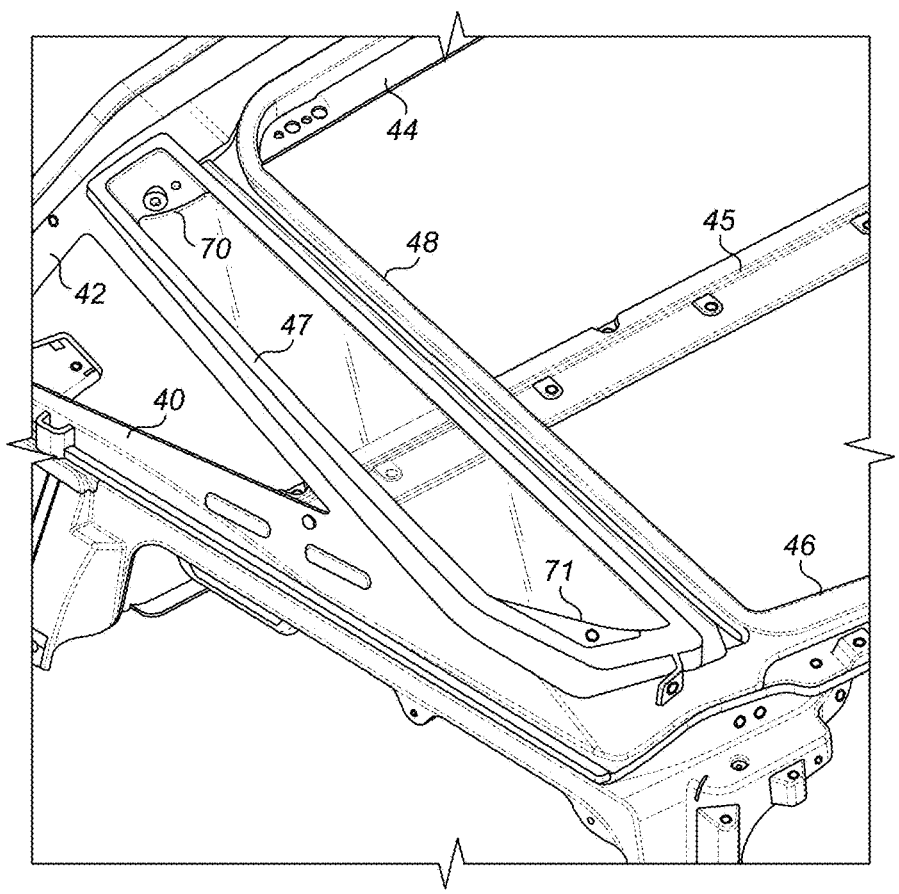
FIG. 4 is a rear-three quarters view of part of the upper structure of the vehicle of FIG. 2 from outside.

The rear part of the upper structure is defined by a frame 39 of beams. FIG. 3 shows the general architecture of the frame and FIG. 4 shows a detail of a rear corner of the frame. The frame is composed of side members 40, 41, uprights 42, 43, an upper cross member 44, a lower cross member 45, a rear cross member 46 and C pillar members 47, 48, 49 and 50. The lower edges of the sides of the frame are defined by the side members 40, 41. The uprights 42, 43 extend upwards from the front ends of respective ones of the side members. The outer C pillar members 47, 50 extend between the upper ends of respective ones of the uprights and the rear ends of respective ones of the side members. In that way the sides of the frame are composed of triangles 40, 42, 47 and 41, 43, 50. The upper cross member 44 extends between the upper ends of both uprights. The lower cross member extends between locations part way along both side members. The rear cross member 46 extends between the rear ends of both side members. The inner C pillar members extend between locations 51, 52, which are part way along the upper cross members, and locations 53, 54, which are part way along the rear cross members.

The frame 39 may be manufactured separately from the lower structure of the car and subsequently installed on the lower structure. Alternatively, the frame may be wholly or partially assembled when part of it is already attached to the lower structure. One or more of the adjoining beams of the frame may be integral with each other, for example as a result of having been co-moulded. The frame may be formed of any suitable material: for example, metal (e.g. steel or aluminium) or a composite material (e.g. a fibre-reinforced resin material such as a carbon fibre composite).

In alternative designs some parts of the frame could be omitted or provided as part of the lower structure. For example, the side members 40, 41 could be part of the lower structure, the lower cross member 45 could be part of the lower structure and/or the rear cross member 46 could be part of the lower structure.

In the example of FIGS. 3 and 4 each of the beams of the upper structure is straight or substantially straight. The beams could be curved. More or fewer beams could be provided. In the example, each of the beams is rigid. Structural parts of the upper structure could be provided by elements other than rigid beams, for example panels, rigid mesh or flexible struts.

The frame defines openings between the beams that run around its upper and rear periphery. Specifically, there is a first opening bounded by beams 40, 42, 47, a second opening bounded by beams 47, 44, 48, 46, a third opening bounded by beams 44, 48, 46, 49, a fourth opening bounded by beams 49, 44, 50, 46 and a fifth opening bounded by beams 50, 43, 41. The first opening and the fifth opening run along the sides of the vehicle. The third opening is directed to the rear and above the vehicle. The second and fourth openings are directed generally to the side, rear and above the vehicle.

In the vehicle of FIG. 2 glass sheets are affixed over each of the first to fifth openings. The side glass sheet 22 is fixed over the first opening, and a corresponding side sheet on the other side of the car is fixed over the fifth opening. The rear glass sheet 23 is fixed over the third opening. Corner or lateral glass sheets 24, 25 are fixed over the second and fourth openings respectively. Each glass sheet is attached to the frame around the periphery of its respective opening, so that it closes the opening. The sheets could be made of composite glass, for example laminated glass. Instead of being made of glass the sheets could be made of polymer material such as polycarbonate. Each sheet is transparent or translucent. Each of the glass sheets may be capable of being seen through from inside the cabin, for example by virtue of it being transparent and also arranged over a through-opening in the frame.

The rear glass sheet may be rigidly attached to the neighbouring elements of the frame. Alternatively, it may be movable: for example, it may retract wholly or partially into the rear deck, e.g. to facilitate movement of a convertible roof. The corner glass sheets may be rigidly attached to the neighbouring elements of the frame. Alternatively, they may be movable, for example by hinging relative to the frame. The side glass sheets may be rigidly attached to the neighbouring elements of the frame. Alternatively, they may be movable, for example by hinging relative to the frame. Each of the glass sheets 22 to 25 may be attached around its entire periphery to members of the frame. Each of the glass sheets may be capable of being seen through from inside the cabin.

Figure 5:
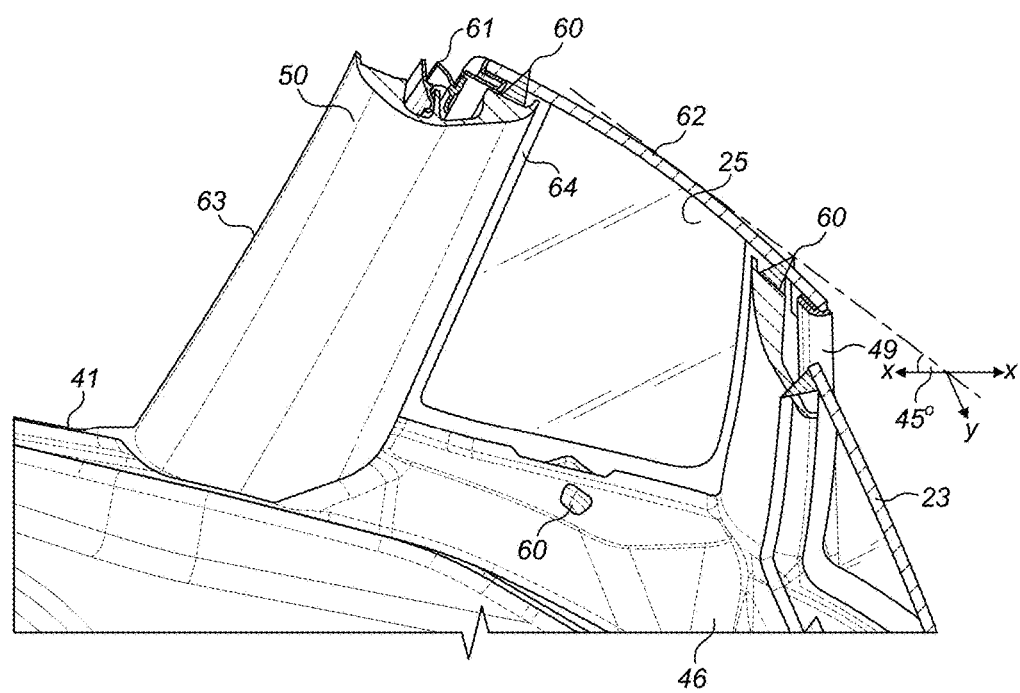
FIG. 5 is a view of part of the upper structure of the vehicle of FIG. 2 sectioned on the line A-A' as shown in FIG. 3.

FIG. 5 is a cross-section through a part of the upper structure on the line A-A' of FIG. 3. FIG. 5 shows that the glass panel 25 can be fixed to the pillars 50, 49 by overlapping them. The glass panel 25 can be bonded and/or attached with positive fixings 60 to the pillars. A trim panel (not shown) can be attached in a fixing element 61 on the pillar 50 to cover the forward edge of the panel 25.

The C pillar members 47-50 serve a number of purposes. First, they provide structural support for one or more of the roof 19, the upper cross member 44, the rear window 23, the side windows 22 and the corner windows 24, 25. For each of those members they may provide the exclusive structural support, or they may contribute substantially to its structural support along with other elements. Those other elements could be the uprights 42, 43 or the A pillars 18. In providing structural support for the roof and/or the upper cross member 44 the C pillar members may contribute substantially to the roll-over protection of the vehicle.

Second, by bracing the frame 39, which is attached to the vehicle lower part, the C pillar members may contribute substantially to the torsional stiffness of the vehicle.

Figure 1:
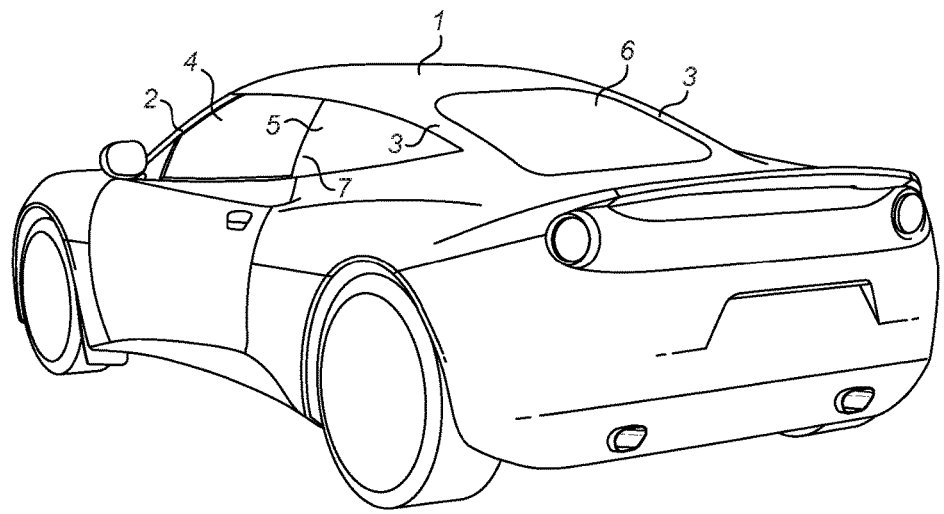
FIG. 1 is a view of a generalised design of a mid-engined sports car.

Third, in comparison to a conventional C pillar structure, e.g. as shown in FIG. 1, the C pillar members of the vehicle of FIG. 2 provide a composite C pillar which is subdivided vertically. This enables the driver to see through the space between the subdivided C pillar elements. This can significantly improve rear visibility, especially in manoeuvres that call for vision to the vehicle's rear quarters, such as parking and overtaking.

Fourth, by providing fixing locations for the edges of the glass panels 22-25 the C pillar members can enable the glass panels to be manufactured more economically. The reasons for this will be discussed in more detail below.

The C pillar members collectively define a pair of composite C pillars. Members 47 and 48 define a left composite C pillar. Members 49 and 50 define a right composite C pillar. Each C pillar member may contribute substantially to the roll-over protection of the vehicle. For example, the roll-over protection provided by the vehicle may be materially impaired in a standard roll-over or roof compression test but for the presence of either the inner or outer C pillar members. But for the presence of either the inner or outer C pillar members the vehicle may fail a roof compression test such as RIN 2127-AG51, Federal Motor Vehicle Safety Standards, Roof Crush Resistance as in force at 1 Aug. 2016. Each C pillar member may contribute substantially to the torsional stiffness of the vehicle. For example, in the absence of either the inner C pillars or the outer C pillars the vehicle may be noticeably worse to a driver of ordinary skill, e.g. when turning into a corner with a lateral force of 0.7 G.

The inner C pillar members may be significantly stronger than the outer C pillar members, or vice versa. Preferably the outer C pillar members are significantly stronger than the inner C pillar members. For example, the outer C pillar members may be 1.5 or more times stiffer than the inner C pillar members. This may be reflected in the cross-sectional area of the C pillar members, as illustrated in FIG. 5. The cross-sectional area of the inner C pillar members in an X-Y plane of the vehicle may be 75% or less of that of the outer C pillar members. That area may be calculated as the total enclosed area or the solid cross-sectional area.

The outer C pillar members may be narrower in the vehicle's Y direction than in the X direction in at least one X-Y plane. The rear part of the surface of the outer C pillar members that faces the interior of the cabin may be angled so as to be directed towards an outwards direction, as shown in FIG. 5. These features can improve sideways visibility between the inner and outer members.

The spacing between the C pillar members of one C pillar in the X-Y plane may be more than a defined distance over all of a defined length. The defined distance may be 5 cm, 10 cm or 15 cm. The defined length may be 30 cm, 50 cm, more than 75% of the length of both members or of the shorter of the members, or more than 90% of the length of both of members or the shorter of the members. This can improve side visibility between the inner and outer members. The outer members may be shorter than the inner members, e.g. between their respective points of attachment to the upper and rear cross members, as shown in FIG. 4.

The C pillar members may be located generally at the rear corners of the vehicle upper structure. A reference X-Y plane may be defined. That plane may be at a typical eye level for the driver of the vehicle: for instance, between 50 and 80 cm above the base of the driver's seat in its lowest configuration, and/or or between 10 and 25 cm below the inner surface of the roof. The reference plane may be mid-way in Z between the lowest point of the rear window 23 and the highest point of the rear window. The outer rear corners of the upper structure may be defined in that plane. For example, they may be defined as the rearmost points at which lines in that plane and at 45° to the vehicle's X and Y axes intersect the exterior of the cabin. An example of such a point is indicated at 62 in FIG. 5. Each outer rear corner may lie between a respective pair of the inner and outer C pillar members. Each outer C pillar member is closer to one of the rear corners than the other. Each outer C pillar has a point lying in the reference plane that is furthest from its closer one of the rear corners (e.g. point 63), and a point in the reference plane that is closest to its closer one of the rear corners (e.g. point 64). That furthest point may be less 50 cm, less than 40 cm, less than 30 cm, less than 20 cm or less than 10 cm from that one of the corners. That closest point may be less 50 cm, less than 40 cm, less than 30 cm, less than 20 cm or less than 10 cm or less than 5 cm from that one of the corners.

The majority of the length of each rear/side corner of the vehicle upper structure (i.e. over all reference X-Y planes that intersect the upper structure) may lie between the respective inner and outer C pillar members.

The fact that the windows 24, 25 are located at the corners of the upper structure can mean that the side windows 22 and the rear window 23 can be of generally simple shape. For example, they can be flat, substantially flat (e.g. such that a plane can be defined which is spaced by no more than 5 mm from any point on one surface of the respective window), or formed with a simple curve (e.g. such that substantially all the variation of the window from planar is due to curvature about one or more parallel axes). As can be seen from FIG. 4, the plane of the mounting surface for a corner glass sheet at its upper end (see edge 70) can rotationally offset from the plane of the mounting surface for the same window at its lower end (see edge 71). This provides for a convenient transition between the sides and rear of the vehicle. To accommodate this the corner glass sheets may be more complex in shape. For example, they may be twisted from top to bottom to accommodate the rotational offset described above. By dividing the glass panels of the rear upper structure in this way, the majority of the panels by number and/or area can be of relatively simple form, and the minority of the panels by number and/or area can be of more complex form. This can help to reduce manufacturing costs. The rear glass sheet and/or the side glass sheets may be formed by bending a flat glass sheet without significant torsion. The corner glass sheets may be formed by applying torsion to a flat glass sheet and optionally also applying bending.

In the examples described above, each composite C pillar is made up of two members (47, 48 or 49, 50) having vertical extent. The composite C pillars could be made up of more than two members having vertical extent.

Preferably, each of the C pillar members (47, 48, 49, 50) is a structural part of the vehicle in that it is effective to inhibit crushing of the roof and/or torsion of the vehicle body. This avoids visibility being limited by potentially unnecessary thickness of the members. Each of the members may, for example, be capable of bearing a longitudinal load of greater than 500 kg without non-elastic deformation.

Each of the C pillar members on one side of the vehicle may be integral with each other. They may be formed as a single component. Alternatively, they may be formed of separate components joined together, for example by bolting, welding or adhesive bonding.

The greatest straight line distance in the X-Y plane between the inner edge of an outer one of the members of a composite C pillar and the outer edge of the inner one of the members of a composite C pillar may, for example, be less than 30 cm, less than 20 cm, less than 15 cm or less than 10 cm. This may help visibility by allowing a reasonable view through the window between the members of one C pillar and also through the windows on either side of it.

The vehicle may have a waistline 26. Conveniently the windows 24, 25 are located above the waistline.

The vehicle may have a fixed roof. The fixed roof could be composed of a panel that is integral with, or takes the place of beam 44. The beam 44 could be located so as to support the roof and/or resist downward force on the roof. The vehicle may have a retractable roof. The beam 44 may be located so that when the retractable roof is in its deployed position the beam 44 is capable of bearing on the roof so as to resist downwards force on the roof.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising a body having an occupant cabin and an upper structure at least partially enclosing the upper part of the occupant cabin, the upper structure comprising:
   a rear window located in the lateral centre of the vehicle;
   first and second structural members extending along either side of the rear window; and
   first and second lateral windows located on either side of the rear window, each of the lateral windows having an inboard edge and an outboard edge, the inboard edge being located rearward of the outboard edge in at least one plane parallel to the running plane of the vehicle, and a respective one of the first and second members extending along the inboard edge, the lateral windows being located at an outer rear corner of the upper structure.

2. The vehicle of claim 1, wherein each of the first and second members has a lower end and an upper end, the upper end being located forward of the lower end.

3. The vehicle of claim 2, comprising a third structural member extending between the upper ends of the first and second members.

4. The vehicle of claim 3, wherein the vehicle has a roof, the third structural member is an elongate member and the third structural member is located to bear on the roof to resist downward force on the roof.

5. The vehicle of claim 4, wherein the vehicle has a retractable roof and the third structural member is located to bear on the roof to resist downward force on the roof when the roof is in its deployed configuration.

6. The vehicle of claim 1, wherein the rear window is transparent and can be seen through from the cabin.

7. The vehicle of claim 1, wherein the lateral windows are transparent and can be seen through from the cabin.

8. The vehicle of claim 7, wherein, for each lateral window, the inboard edge of that window is located rearward of the outboard edge of that window in all planes parallel to the running plane of the vehicle through which the window can be seen from the cabin.

9. The vehicle of claim 1, comprising third and fourth structural members extending along the outboard edges of respective ones of the first and second lateral windows.

10. The vehicle of claim 9, wherein the first and third structural members collectively form a composite C pillar at one side of the vehicle upper structure and the third and fourth structural members collectively form a composite C pillar at the other side of the vehicle upper structure.

11. The vehicle of claim 1, wherein the vehicle comprises side windows running along the sides of the upper structure.

12. The vehicle of claim 11, wherein the inboard edge of each lateral window is aligned with the neighbouring edge of the rear window, and the outboard edge of each lateral window is aligned with the neighbouring edge of a respective one of the side windows.

13. The vehicle of claim 11, comprising third and fourth structural members extending along the outboard edges of respective ones of the first and second lateral windows, wherein the third and fourth structural members extend along the rear edges of respective ones of the side windows.

14. The vehicle of claim 1, wherein the lateral windows are torsionally offset between their upper and lower ends.

15. The vehicle of claim 1, wherein the vehicle has a single row of seats.

16. A vehicle as claimed in any preceding claim, wherein the vehicle is a road vehicle.

17. The vehicle of claim 12, comprising third and fourth structural members extending along the outboard edges of respective ones of the first and second lateral windows, wherein the third and fourth structural members extend along the rear edges of respective ones of the side windows.

* * * * *